United States Patent
Wang et al.

(10) Patent No.: US 10,387,137 B2
(45) Date of Patent: Aug. 20, 2019

(54) SINGLE SKILL PACKAGE UPGRADE MANAGEMENT APPARATUS AND METHOD THEREOF

(71) Applicant: Shenzhen Gowild Robotics Co., Ltd, Shenzhen, Guangdong (CN)

(72) Inventors: Haofen Wang, Guangdong (CN); Nan Qiu, Guangdong (CN); Xinyu Yang, Guangdong (CN)

(73) Assignee: Su Zhou GowildRobotics Co., Ltd, Suzhou (CN)

( * ) Notice: Subject to any disclaimer, the term of this patent is extended or adjusted under 35 U.S.C. 154(b) by 0 days.

(21) Appl. No.: 15/742,061

(22) PCT Filed: Jun. 28, 2016

(86) PCT No.: PCT/CN2016/087529
§ 371 (c)(1),
(2) Date: Jan. 5, 2018

(87) PCT Pub. No.: WO2018/000209
PCT Pub. Date: Jan. 4, 2018

(65) Prior Publication Data
US 2019/0108011 A1    Apr. 11, 2019

(51) Int. Cl.
*G06F 8/65* (2018.01)
*G06F 16/953* (2019.01)
*G06F 9/48* (2006.01)
*G06F 17/18* (2006.01)
*G06F 8/70* (2018.01)

(52) U.S. Cl.
CPC ............... *G06F 8/65* (2013.01); *G06F 8/70* (2013.01); *G06F 9/4887* (2013.01); *G06F 16/953* (2019.01); *G06F 17/18* (2013.01)

(58) Field of Classification Search
CPC ........ G06F 8/65; G06F 9/4887; G06F 16/953; G06F 17/18
See application file for complete search history.

(56) References Cited

U.S. PATENT DOCUMENTS

| | | | |
|---|---|---|---|
| 2005/0091651 A1* | 4/2005 | Curtis | G06F 8/65 717/168 |
| 2015/0212808 A1* | 7/2015 | Mandava | G06F 8/65 717/168 |

* cited by examiner

Primary Examiner — Wei Y Zhen
Assistant Examiner — Amir Soltanzadeh

(57) ABSTRACT

A single skill package upgrade management apparatus for managing upgrading of skill packages installed in an intelligent robot is provided with a statistics module, a determination module, and an upgrade module. The statistics module includes a local statistics unit and a network statistics unit. The determination module includes a timeline determination unit, a number determination unit, and an integration determination unit. The determination module further arranges the skill packages in a sequence. The skill package has a highest priority is scheduled to be upgraded first. An upgrade time of each skill package is scheduled to be in the duration of use having the least number of uses of each skill package. There is further provided a privilege module. A single skill package upgrade management method is also provided.

4 Claims, 2 Drawing Sheets

SINGLE SKILL PACKAGE UPGRADE MANAGEMENT APPARATUS AND METHOD THEREOF

BACKGROUND OF THE INVENTION

1. Field of the Invention

The invention relates to upgrade management and more particularly to a single skill package upgrade management apparatus and method thereof.

2. Description of Related Art

With the gradual development of intelligent robot and the Internet, the performance of the intelligent robot is improved greatly. The Internet industry continuously introduces a variety of skill packages to enrich the capability of intelligent robots. Each skill package represents a kind of the capability of intelligent robot. An intelligent robot completes the learning process by installing skill package, thereby being multifunctional and bringing happiness to users.

But with the growing number of skill packages, intelligent robots are plagued by the problem of skill upgrading. For different users of different skill packages the uses of them are not identical. But the skill package update time is usually a minor update per week, a major update per two-week, or just an update per two-week. In the process of using an intelligent robot, each skill package often requires a user to wait for a long time. To the worse, some seldom use or low praise score skill packages may be automatically updated. And in turn, users may have bad impression or experience to such updates.

SUMMARY OF THE INVENTION

For solving the technical problems of the conventional art, the invention provides a single skill package upgrade management apparatus and method thereof to reduce interference of the single skill upgrade of the intelligent robot to a user, alternate the single skill package upgrade time, alternate the time of use of the single skill package, and greatly increase a user's good experience of using same.

For solving the technical problems of the conventional art, the invention provides a single skill package upgrade management apparatus for managing upgrading of a plurality of skill packages installed in an intelligent robot, comprising a statistics module for collecting data of use parameters of each skill package in the intelligent robot, and collecting data of attention parameters of each skill package wherein the use parameters include number of uses, time of use, and duration of use; and the attention parameters include number of downloads, degree of attention, evaluation score, and praise score of a corresponding skill package, number of readings of one of the skill packages by users; and number of user feedbacks; a determination module for analyzing the use parameters and the attention parameters of all of the skill packages by comparison, determining the skill packages to be upgraded, and determining an upgrade time of the skill packages to be upgraded; and an upgrade module for obtaining the skill packages to be upgraded by accessing the Internet and upgrading the skill packages in the upgrade time; wherein the statistics module includes a local statistics unit for reading the use parameters of each skill package in the intelligent robot based on use conditions, and a network statistics unit connecting to a network cloud to collect data of the attention parameters of each skill package; wherein the determination module includes: a timeline determination unit for establishing a timeline; analyzing the number of uses, the time of use, and the duration of use of each skill package as the timeline evolves; and determining the duration of use having the greatest number of uses and the duration of use having the least number of uses of each skill package; a number determination unit for determining the number of downloads, the degree of attention, the evaluation score, and the praise score of each skill package; viewing times of the skill packages, and the number of user feedbacks on the Internet; and an integration determination unit for determining the skill packages to be upgraded and an upgrade time of the skill packages to be upgraded based on results sent from both the timeline determination unit and the number determination unit; wherein based on the determination of the number of downloads, the degree of attention, the evaluation score, and the praise score of each skill package; the viewing times of the skill packages, and the number of user feedbacks on the Internet, the determination module arranges the skill packages in a sequence wherein the skill package has a highest priority in the sequence is scheduled to be upgraded first, and wherein an upgrade time of each skill package is scheduled to be in the duration of use having the least number of uses of each skill package based on the duration of use of the skill package having a highest priority in the sequence; and further comprising a privilege module for specifying which skill packages in the intelligent robot as skill packages to be upgraded, and assigning an upgrade time for each skill package.

For solving the technical problems of the conventional art, the invention further provides an intelligent robot is configured to manage an upgrading of a single skill package of a plurality of skill packages installed therein.

For solving the technical problems of the conventional art, the invention still further provides a single skill package upgrade management method for managing upgrading of a plurality of skill packages installed in an intelligent robot, comprising the steps of (a) collecting data of use parameters and attention parameters of each skill package wherein the use parameters include number of uses, time of use, and duration of use; and the attention parameters include number of downloads, degree of attention, evaluation score, and praise score of a corresponding skill package, number of readings of one of the skill packages by users; and number of user feedbacks; (b) integratively analyzing the use parameters and the attention parameters of each skill package to determine the skill packages to be upgraded and their upgrading time; and (c) obtaining a skill package to be upgraded from the Internet, and upgrading the skill package at an upgrade time.

Preferably, step (b) further comprises the sub-steps of (b1) reading the use parameters of each skill package in the intelligent robot based on use conditions, and (b2) connecting to a network cloud to collect data of the attention parameters of each skill package.

Preferably, step (c) further comprises the sub-steps of (c1) establishing a timeline; (c2) analyzing the number of uses, the time of use, and the duration of use of each skill package as the timeline evolves; (c3) determining the duration of use having the greatest number of uses and the duration of use having the least number of uses of each skill package; (c4) determining the number of downloads, the degree of attention, the evaluation score, and the praise score of each skill package; viewing times of the skill packages, and the number of user feedbacks on the Internet; and (c5) determining the skill packages to be upgraded and an upgrade time of the skill packages to be upgraded based on results sent from both the timeline determination unit and the number determination unit.

Preferably, sub-step (c5) further comprising based on the determination of the number of downloads, the degree of attention, the evaluation score, and the praise score of each skill package; the viewing times of the skill packages, and the number of user feedbacks on the Internet, arranging the skill packages in a sequence wherein the skill package has a highest priority in the sequence is scheduled to be upgraded first, and wherein an upgrade time of each skill package is scheduled to be in the duration of use having the least number of uses of each skill package based on the duration of use of the skill package having a highest priority in the sequence.

In comparison with the conventional art, the single skill package upgrade management apparatus of the invention employs a novel skill package approach to manage the functional modules of the intelligent robot, facilitate the startup of the intelligent robot, and integratively determine at least one skill package to be upgraded based on the use parameters of the skill packages of the intelligent robot and attention parameters of respective skill packages over the network. By utilizing the invention, it is possible of decreasing the interference of upgrading the single skill package of the intelligent robot to a user, alternating the upgrade time of the single skill package with the time of use of the corresponding skill package, and leaving better user experience.

The above and other objects, features and advantages of the invention will become apparent from the following detailed description taken with the accompanying drawings.

DETAILED DESCRIPTION OF THE INVENTION

A detailed description of the characteristics of the invention is described below. Obviously, the preferred embodiment described herein is just a portion of the invention not all of the invention. Based on the example of the invention, one of ordinary artisans in the art may understand that other embodiments are possible and are within the scope of the invention.

Skill package refers to a function module on an intelligent robot operation. However, the provision of many skill packages also brings trouble to users and it mainly reflects in the news feeds and program updates. When an intelligent robot user downloads a type of skill package based on needs and the user is not satisfied with the downloaded type of skill package, the user may choose to download the same type of skill package in a next try. But the inappropriate skill package may be retained. Based on the high performance of intelligent robot, the retrained skill package has little effect in the intelligent robot users. But such skill package often sends a message to the user, or effect an automatic update. Users have to uninstall the skill package or prevent the message and updates from sending by system settings. However, a user may have a bad experience. Thus, there is a need for invention to provide a single skill package upgrade management apparatus and method thereof with respect to the intelligent robot.

Figure 1:
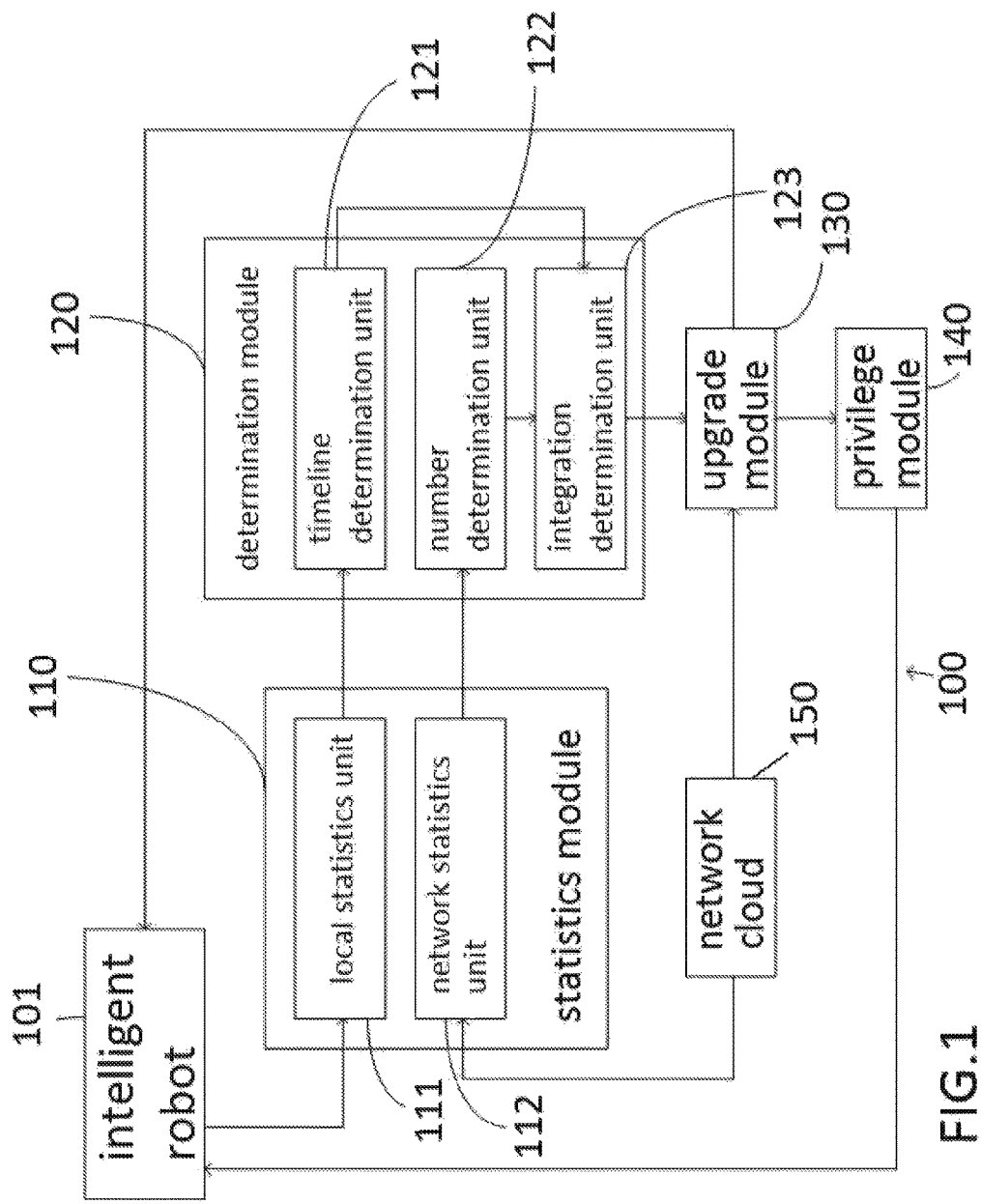
FIG. 1 is a schematic of an embodiment of a single skill package upgrade management apparatus according to the invention.

FIG. 1 is a schematic diagram of an embodiment of a single skill package upgrade management apparatus 100 according to the invention. The single skill package upgrade management apparatus 100 is provided on an intelligent robot 101 to manage the upgrade of the single skill package installed in the intelligent robot 101. Multiple skill packages are installed in the intelligent robots 101. The apparatus 100 includes a statistics module 110, a determination module 120 and an upgrade module 130.

The statistics module 110 is used to collect data of use parameters of each skill package in the intelligent robot 101, and collect data of attention parameters of each skill package. The use parameters include number of uses, time of use, and duration of use. The attention parameters of the skill package include number of downloads, degree of attention, evaluation score and praise score of a corresponding skill package; number of readings of the skill package by users; and number of user feedbacks. The statistics module 110 includes a local statistics unit 111 and a network statistics unit 112. The local statistics unit 111 is used to read the use parameters of each skill package in the intelligent robot 101. Specifically, in the process of operating the intelligent robot 101, the local statistical unit 111 monitors the use of all skill packages installed in the intelligent robot 101, and collects data of the number of uses, the time of use, and the duration of use of each skill package in real time. In this embodiment, the local statistical unit 111 collects data of the use parameters in a predetermined period of time for statistical purpose. For example, the predetermined period of time is three hours, a day or a week. Alternatively, data of the user parameters is collected in a number of time periods. The number of uses in the use parameters refers to the times of a specific skill package being used in a predetermined period of time. Thus, it can reflect the user's dependence on the specific skill package. Time of use refers to how long a user using a skill package after opening same. Details can be customized by users include recording the time of use of a skill package by a user, and recording the time of use of the skill package and the time of use of other skill packages as a whole. Duration of use refers to a period of time that a user uses a skill package. Through the duration of use, it is possible of determining an optimum time for upgrading a corresponding skill package, i.e., causing no objection from a user when upgrading the skill package at the duration of use. The network statistics unit 112 connects to a network cloud 150 to collect data of the attention parameters of each skill package. The attention parameters include data of skill packages downloaded from the Internet or evaluation websites for the intelligent robot 101, and times of attention and evaluation scores of skill packages downloaded from different websites.

The determination module 120 is used to analyze the use parameters and the attention parameters of all skill packages by comparison, determine which skill packages should be upgraded, and determine the skill package upgrade time. The determination module 120 includes a timeline determination unit 121, a number determination unit 122 and an integration determination unit 123. The timeline determination unit 121 is used to establish a timeline and analyze the number of uses, the time of use, and the duration of use of each skill package as the timeline evolves. Therefore, it is possible of determining which duration of use having the greatest number of uses and which duration of use having the least number of uses. Further, the number of uses and the time of use are labeled on the timeline. Thus, the number of uses, the time of use, and the duration of use of each skill package can be determined on the timeline.

The number determination unit 122 is used to determine the number of downloads, degree of attention, evaluation score and praise score of each skill package on the network. In this embodiment, based on the attention parameters, the number determination unit 122 establishes tables and analyzes the number of downloads, the degree of attention, the evaluation score, the praise score, viewing times of the skill packages, and the number of users feedback. The integration determination unit 123 is used to determine which skill package should be upgraded and its upgrade time based on results sent from the timeline determination unit 121 and the number determination unit 122. The determination made by the integration determination unit 123 is based on the use parameters and the attention parameters.

In the embodiment, the intelligent robot 101 is provided with seven skill packages A-G. It is found that the skill packages A, B, C, D, E, F and G have the highest number of uses per day; the skill package A has the highest number of uses, the skill package F has the lowest time of use, and the skill packages B, C, D, E and F have the number of uses between the highest and the lowest and are arranged in a descending order in a predetermined period of time; and the skill packages A, B and C have the greatest number of downloads, the degree of attention, and the evaluation score by reading the attention parameters. It is thus determined that the skill packages A, B and C are the most used ones by a specific user. The user has high dependencies and attention to the skill packages A, B and C. Hence, these skill packages should be regularly updated and upgraded in order to provide better services to the user. In practice, the integration determination unit 123 analyzes and calculates the use parameters and attention parameters of all of the skill packages to determine which skill packages are mostly depended by the users and which skill packages are least used by the users. Further, a ratio of the skill packages that are mostly depended by the users to the skill packages that are least used by the users can be set in order to obtain an accurate number of the skill packages to be upgraded. Parameters regarding the duration of use in the use parameters of the skill packages are used to upgrade the skill packages to be upgrade in a less use period of time. If there is a coincidence among the skill packages to be upgraded or any two skill packages scheduled to be upgraded in less than 10-minute span, the time for upgrading the least depended skill packages can be changed based on the dependence thereof. This ensures that respective skill packages can be upgraded in different periods of time and prevents some skill packages from waiting excessive long period of time for upgrade. In other embodiments, the integration determination unit 123 governs the upgrade time of all of the skill packages, memory sizes of the skill package memories, and the network access status of the intelligent robot 101. Further, the integration determination unit 123 delays the update if it estimates that it is impossible of downloading the skill package in one minute based on the network access status and the size of the skill package. The integration determination unit 123 will calculate and resume the delayed update when a next time of use available. For those seldom used skill packages, they are set as not scheduled for upgrade so that a user may have good experience in using the intelligent robot.

After determining the skill packages to be upgraded and the upgrade time for them, the upgrade module 130 obtains the skill packages to be upgraded by accessing the Internet and then upgrades the skill packages in the assigned upgrade time.

There is further provided a privilege module 140 which specifies which skill packages in all of the skill packages of the intelligent robot 101 as skill packages required to be upgraded, and assigns the upgrade time for each of the skill packages.

In comparison with the conventional art, the single skill package upgrade management apparatus of the invention employs a novel skill package approach to manage the functional modules of the intelligent robot, facilitate the startup of the intelligent robot, and integratively determine at least one skill package to be upgraded based on the use parameters of the skill packages of the intelligent robot and attention parameters of respective skill packages over the network. By utilizing the invention, it is possible of decreasing the interference of upgrading the single skill package of the intelligent robot to a user, alternating the upgrade time of the single skill package with the time of use of the corresponding skill package, and leaving better user experience.

The invention also provides an intelligent robot which can manage the upgrade of the skill packages of the intelligent robot by using the single skill package upgrade management apparatus 100 discussed above. Further, the intelligent robot can determine which skill packages to be upgraded and the time to upgrade same by collecting data of use status of respective skill packages, the number of users subscribing the skill packages, the number of clicking the skill packages, and popularity of the skill packages.

Figure 2:
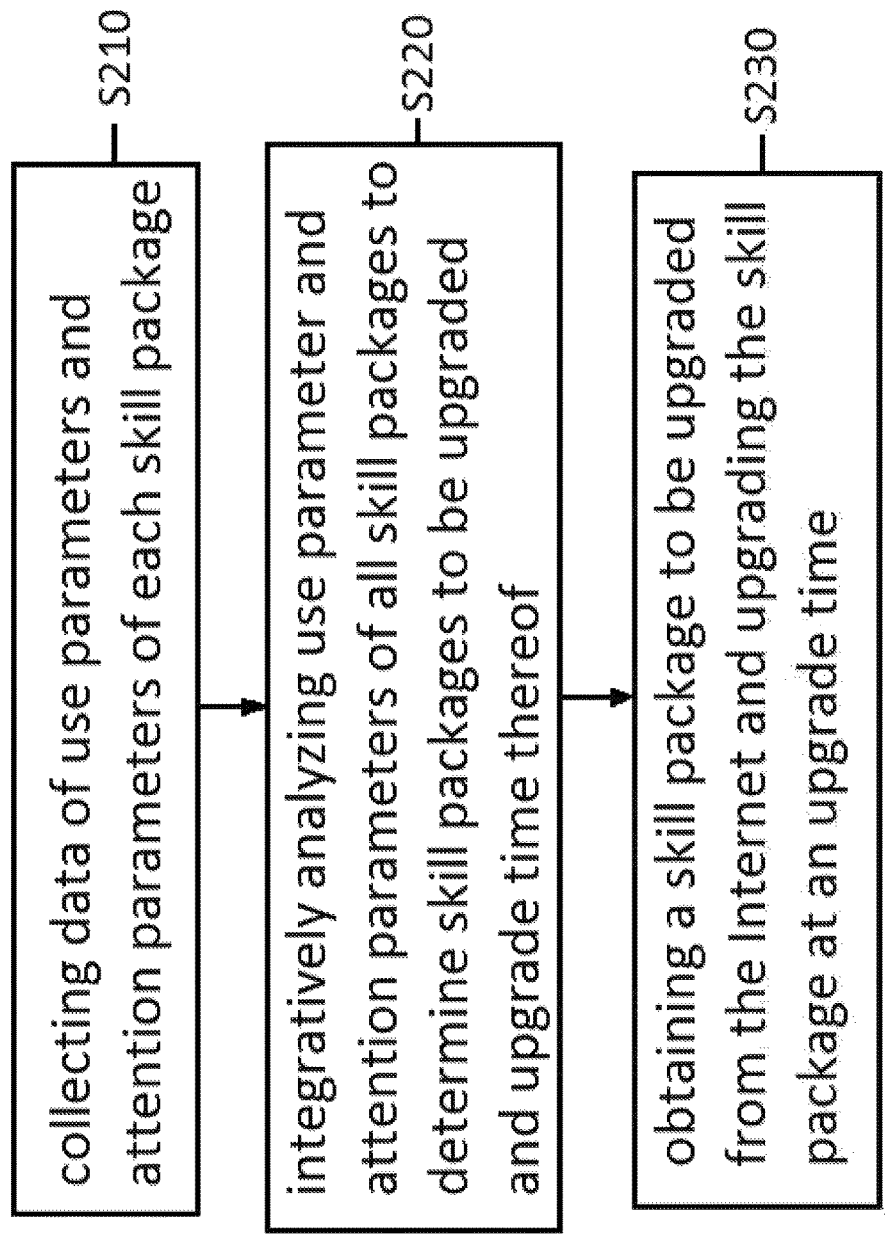
FIG. 2 is a flow chart of a single skill package upgrade management method according to the invention.

FIG. 2 is a flow chart illustrating a single skill package upgrade management method of the invention. The method comprises the following steps:

Step S210: collecting data of the use parameters of each skill package in the intelligent robot and the attention parameters of each skill package.

Data of the use parameters of each skill package in the intelligent robot and the attention parameters for each skill package are collected. The use parameters include number of uses, time of use, and duration of use. The attention parameters of the skill package include number of downloads, degree of attention, evaluation score and praise score of a corresponding skill package; number of readings of the skill package by users; and number of user feedbacks based on respective skill packages of the intelligent robot being used. In the embodiment, in the process of operating the intelligent robot, the use of all skill packages installed in the intelligent robot is monitored; and data of the number of uses, the time of use, and the duration of use of each skill package is collected in real time. In this embodiment, data of the use parameters is collected in a predetermined period of time for statistical purpose. For example, the predetermined period of time is three hours, a day or a week. Alternatively, data of the user parameters is collected in a number of time periods. The number of uses in the use parameters refers to the times of a specific skill package being used in a predetermined period of time. Thus, it can reflect the user's dependence on the specific skill package. The time of use refers to how long a user using a skill package after opening same. Details can be customized by users include recording the time of use of a skill package by a user, and recording the time of use of the skill package and the time of use of other skill packages as a whole. Duration of use refers to a period of time that a user uses a skill package. Through the during of use, it is possible of determining an optimum time for upgrading a corresponding skill package, i.e., causing no objection from a user when upgrading the skill package at the duration of use. The network cloud 150 is connected to the Internet to collect data of the attention parameters of each skill package. The attention parameters include data of skill packages downloaded from the Internet or evaluation websites for the intelligent robot, and times of attention and evaluation scores of skill packages downloaded from different websites.

Step S220: integratively analyzing the use parameters and the attention parameters of all skill packages to determine skill packages to be upgraded and their upgrading time.

The integrative analysis analyzes the use parameters and the attention parameters of all skill packages by comparison, determines which skill packages should be upgraded, and determine the skill package upgrade time. A timeline is established and the number of uses, the time of use, and the duration of use of each skill package are analyzed as the timeline evolves. Therefore, it is possible of determining which duration of use having the greatest number of uses and which duration of use having the least number of uses. Further, the number of uses and the time of use are labeled on the timeline. Thus, the number of uses, the time of use, and the duration of use of each skill package can be determined on the timeline. The number of downloads, degree of attention and evaluation score of each skill package on the network are determined. In this embodiment, based on the attention parameters, tables are established and the number of downloads, the degree of attention, the evaluation score, the praise score, viewing times of skill package, and the number of users feedback are analyzed. Which skill package should be upgraded and its upgrade time are determined based on the use parameters and the attention parameters. In the embodiment, the intelligent robot is provided with seven skill packages A-G. It is found that the skill packages A, B, C, D, E, F and G have the highest number of uses per day; the skill package A has the highest number of uses, the skill package F has the lowest time of use, and the skill packages B, C, D, E and F have the number of uses between the highest and the lowest and are arranged in a descending order in a predetermined period of time; and the skill packages A, B and C have the greatest number of downloads, the degree of attention, and the evaluation score by reading the attention parameters. It is thus determined that the skill packages A, B and C are the most used ones by a specific user. The user has high dependencies and attention to the skill packages A, B and C. Hence, these skill packages should be regularly updated and upgraded in order to provide better services to the user. In practice, the use parameters and attention parameters of all of the skill packages are analyzed and calculated to determine which skill packages are mostly depended by the users and which skill packages are least used by the users. Further, a ratio of the skill packages that are mostly depended by the users to the skill packages that are least used by the users can be set in order to obtain an accurate number of the skill packages to be upgraded. Parameters regarding the duration of use in the use parameters of the skill packages are used to upgrade the skill packages to be upgrade in a less use period of time. If there is a coincidence among the skill packages to be upgraded or any two skill packages scheduled to be upgraded in less than 10-minute span, the time for upgrading the least depended skill packages can be changed based on the dependence thereof. This ensures that respective skill packages can be upgraded in different periods of time and prevents some skill packages from waiting excessive long period of time for upgrade. In other embodiments, the upgrade time of all of the skill packages, memory sizes of the skill package memories, and the network access status of the intelligent robot are governed. Further, the update will be delayed if it estimates that it is impossible of downloading the skill package in one minute based on the network access status and the size of the skill package. The delayed update will be calculated and resumed when a next time of use available. For those seldom used skill packages, they are set as not scheduled for upgrade so that a user may have good experience in using the intelligent robot.

S230: obtaining a skill package to be upgraded from the Internet, and upgrading the skill package at an upgrade time.

After determining the skill package to be upgraded and the upgrade time, the skill package is upgraded at the upgrade time.

In comparison with the conventional art, the single skill package upgrade management apparatus of the invention employs a novel skill package approach to manage the functional modules of the intelligent robot, facilitate the startup of the intelligent robot, and integratively determine at least one skill package to be upgraded based on the use parameters of the skill packages of the intelligent robot and attention parameters of respective skill packages over the network. By utilizing the invention, it is possible of decreasing the interference of upgrading the single skill package of the intelligent robot to a user, alternating the upgrade time of the single skill package with the time of use of the corresponding skill package, and leaving better user experience.

While the invention has been described in terms of preferred embodiments, those skilled in the art will recognize that the invention can be practiced with modifications within the spirit and scope of the appended claims.

What is claimed is:

1. A single skill package upgrade management method for managing upgrading of a plurality of skill packages installed in an intelligent robot, comprising the steps of:
    (a) collecting data of use parameters and attention parameters of each skill package wherein the use parameters include number of uses, time of use, and duration of use; and the attention parameters include number of downloads, degree of attention, evaluation score, and praise score of a corresponding skill package, number of readings of one of the skill packages by users; and number of user feedbacks;
    (b) integratively analyzing the use parameters and the attention parameters of each skill package to determine the skill packages to be upgraded and their upgrading time; and
    (c) obtaining a skill package to be upgraded from the Internet, and upgrading the skill package at an upgrade time;
    wherein the intelligent robot is provided with seven skill packages A, B, C, D, E, F, and G; wherein the skill packages A, B, C, D, E, F and G have the highest number of uses per day; wherein the skill packages A, B, C, D, E, F, and G are arranged in a descending order based on the number of uses; wherein the skill packages A, B and C have the greatest number of downloads, the degree of attention, and the evaluation score in view of the attention parameters; and wherein it is determined that the skill packages A, B, and C are the most used ones.

2. The single skill package upgrade management method of claim 1, wherein step (b) further comprises the sub-steps of (b1) reading the use parameters of each skill package in the intelligent robot based on use conditions, and (b2) connecting to a network cloud to collect data of the attention parameters of each skill package.

3. The single skill package upgrade management method of claim 1, wherein step (c) further comprises the sub-steps of (c1) establishing a timeline; (c2) analyzing the number of uses, the time of use, and the duration of use of each skill package as the timeline evolves; (c3) determining the duration of use having the greatest number of uses and the duration of use having the least number of uses of each skill package; (c4) determining the number of downloads, the degree of attention, the evaluation score, and the praise score of each skill package; viewing times of the skill packages, and the number of user feedbacks on the Internet; and (c5) determining the skill packages to be upgraded and an upgrade time of the skill packages to be upgraded based on results sent from both the timeline determination unit and the number determination unit.

4. The single skill package upgrade management method of claim 3, wherein sub-step (c5) further comprises based on the determination of the number of downloads, the degree of attention, the evaluation score, and the praise score of each skill package; the viewing times of the skill packages, and the number of user feedbacks on the Internet, arranging the skill packages in a sequence wherein the skill package has a highest priority in the sequence is scheduled to be upgraded first, and wherein an upgrade time of each skill package is scheduled to be in the duration of use having the least number of uses of each skill package based on the duration of use of the skill package having a highest priority in the sequence.

\* \* \* \* \*